US011313755B2

(12) United States Patent
Jagannathan et al.

(10) Patent No.: US 11,313,755 B2
(45) Date of Patent: Apr. 26, 2022

(54) AUTOMATED PIPELINE MAINTENANCE USING MULTIPLE PIGS OVER TIME (71) Applicant: HALLIBURTON ENERGY SERVICES, INC., Houston, TX (US)

(72) Inventors: Srinivasan Jagannathan, Houston, TX (US); Aurel Adrian Popoviciu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 228 days.

(21) Appl. No.: 16/755,156

(22) PCT Filed: Jun. 12, 2019

(86) PCT No.: PCT/US2019/036706
§ 371 (c)(1),
(2) Date: Apr. 10, 2020

(87) PCT Pub. No.: WO2020/251560
PCT Pub. Date: Dec. 17, 2020

(65) Prior Publication Data
US 2022/0003629 A1 Jan. 6, 2022

(51) Int. Cl.
G01N 29/04 (2006.01)
G01M 3/28 (2006.01)
(Continued)

(52) U.S. Cl.
CPC .......... *G01M 3/2815* (2013.01); *F16L 55/46* (2013.01); *F17D 5/06* (2013.01); *G01N 29/043* (2013.01)

(58) Field of Classification Search
CPC .... G01M 3/2815; G01N 29/043; F16L 55/46; F17D 5/06
See application file for complete search history.

(56) References Cited

U.S. PATENT DOCUMENTS 6,336,238 B1   1/2002   Tarlton
6,409,843 B1   6/2002   Ellett
(Continued)

FOREIGN PATENT DOCUMENTS

RU   2683336      3/2019
WO   2010017599   2/2010
(Continued)

OTHER PUBLICATIONS

PCT/US2019/036706, "International Search Report and Written Opinion", dated Mar. 11, 2020, 9 pages.
(Continued)

*Primary Examiner* — Tarun Sinha
(74) *Attorney, Agent, or Firm* — Kilpatrick Townsend & Stockton LLP (57) ABSTRACT Dynamic pressure wave propagation can be used in pipelines to provide information about the available, unobstructed diameter and any partial or complete blockages in the pipeline. Based on this information, a system can automatically determine optimal times to launch pipeline inspection gauges for cleaning or other purposes. A pipeline inspection gauge is sometimes referred to as a pig. Certain aspects and features include a system that can launch pigs as needed automatically by activating an automatic multiple pig launcher at appropriate times.

20 Claims, 8 Drawing Sheets (51) Int. Cl.
    *F16L 55/46*    (2006.01)
    *F17D 5/06*     (2006.01)

(56) References Cited

U.S. PATENT DOCUMENTS

| | | | |
|---|---|---|---|
| 9,651,190 B1* | 5/2017 | Hailey | F16L 55/46 |
| 2002/0035437 A1* | 3/2002 | Tingley | G01N 29/11 |
| | | | 702/51 |
| 2012/0255933 A1 | 10/2012 | McKay et al. | |

FOREIGN PATENT DOCUMENTS

| WO | 2010094809 A1 | 8/2010 |
|---|---|---|
| WO | 2016094525 | 6/2016 |
| WO | 2017011850 | 1/2017 |

OTHER PUBLICATIONS

Norwegian Application No. NL2025497, Office Action, dated Feb. 1, 2021, 10 pages.

* cited by examiner

AUTOMATED PIPELINE MAINTENANCE USING MULTIPLE PIGS OVER TIME

TECHNICAL FIELD

The present disclosure relates generally to autonomous control of the optimum launching time of pipeline inspection gauges used for cleaning, inspection or lubrication. More particularly, the present disclosure relates to a system that automatically monitors, at least, the unobstructed diameter of the pipeline over time and determines at what time interval or at what specific times pipeline maintenance using an automatic pig launcher should be undertaken.

BACKGROUND

The pipeline network is a transportation system used to move goods and materials. The most common products transported are for energy purposes. Such products include natural gas, biofuels, and liquid petroleum. Pipeline characteristics vary by the goods transported, the size of the pipes, and the material used to make the pipes. Maintenance of these pipeline networks must be performed for economic purposes as well as for regulatory purposes. Pigging (or the use of a pipeline inspection gauge, sometimes called a pig) can be employed in the pipeline maintenance process. Maintenance includes identifying, evaluating and fixing pipeline issues. Examples of such issues include cracks, leaks, and internal debris that builds up over time.

Pigs can be launched into a pipeline either manually or automatically. Launching a pig manually involves inserting a pig into a trap, and operating the trap control devices using appropriate sequence and timing. Automatic pig launching can be accomplished using an installation commonly referred to as an automatic multiple pig launcher (AMPL). An AMPL allow multiple pigs to be loaded simultaneously. Sometimes, an AMPL includes a cassette of pigs. Today, a pipeline operator can launch a pig locally by pushing a button on a control panel or remotely by entering a command into a computer in a control room. AMPLs save wear and tear on trap doors and other pipeline hardware and reduce the amount of manual labor involved in pigging activity.

DETAILED DESCRIPTION

Certain aspects and features relate to using dynamic pressure wave propagation in pipelines to interrogate and provide information about the available, unobstructed hydraulic diameter and optionally, leaks. Certain aspects and features can be used to automatically determine optimal times to launch pipeline inspection gauges, which may be referred to herein as a pigs. Certain aspects and features can be used to launch pigs as needed automatically by activating an automatic multiple pig launcher at appropriate times.

With a conventional pig launcher, a trap is pressurized and completely loaded with pipeline product. Various valves are either open or closed to provide appropriate initial pressure paths. In order to launch a pig, as an example, a mainline trap valve and a kickerline valve are initially closed. A vent valve is opened to vent the trap to atmospheric pressure. When the trap is completely vented (zero or near zero manometric) with the vent valve still open, a closure door is opened and the pig is inserted. The closure door is closed and secured and air is purged from the trap through a vent valve by slowly opening a kickerline valve. When the purge is done, the vent valve is closed to allow pressure equalization between trap and pipeline, then the kicker valve is closed. Once the mainline trap valve and the kickerline valve are opened, the pig is ready to be launched. At that point, a bypass valve is partially closed to increase the product flow rate through the kickerline valve behind the pig. The bypass valve is closed until the pig leaves the trap, inserting itself into the pipeline current.

Some pipeline operators have sought to reduce the manual labor above by using an automatic multiple pig launcher (AMPL). An AMPL allows at least a cleaning pig to be released at the press of a button, even without the need for personnel to be onsite, while still permitting more complex inspection pigs to be launched when needed. An AMPL pre-stages multiple pigs and launching each single pig is accomplished with electrically and in some cases remotely controlled hardware. However, maintenance personnel need to determine when to launch cleaning pigs, either by keeping records of pipeline buildup as observed with periodic inspections or by setting up a cleaning schedule based on experience and hoping for the best results. While AMPL systems reduce personnel requirements as the launchers are opened much more infrequently, the initial cost of an AMPL can be prohibitive if future pigging requirements are unknown or not fully understood, since some level of manual pipeline monitoring must be maintained. Thus, AMPL usage among pipeline operators has remained limited.

Certain aspects and features of this disclosure relate to programmatically monitoring and estimating pipeline debris to provide automatic, optimized control of pig launch times at an AMPL, instead of using the launch times at pre-defined fixed intervals or using launch times determined by operator experience. Pigs will be launched only when necessary. A pipeline will be pigged when the debris level in the pipeline is greater than a threshold level, the hydraulic diameter is less than a threshold level, or based on other preselected criteria. In some aspects, pigging can be completely automated, with a processor launching a pig at the appropriate time automatically.

In one example, a system includes a pressure transducer for coupling with a pipeline for transporting hydrocarbon fluids. A processing device is communicatively couplable to the pressure transducer and a non-transitory memory device includes instructions that are executable by the processing device to cause the processing device to perform operations. The operations include generating a pressure wave in the pipeline and recording a reflex pressure pulse as a function of time in response to the pressure wave to produce a pressure response. The operations further include comparing the pressure response to a clean simulation profile of the pipeline to extrapolate a deposit profile for the pipeline and determining a launch time for a pipeline inspection gauge by comparing the deposit profile for the pipeline to at least one launch criterion for the pipeline inspection gauge.

In some examples, the system can automatically launch a pig at the determined launch time, for example, by activating an automatic multiple pig launcher that is communicatively couplable to the processing device. In some examples, the system can also determine a presence or absence of leaks in the pipeline by comparing the pressure response to the clean simulation profile. A clean simulation profile can be produced, for example, using the current properties of the fluid in the pipeline, the current operating conditions of the pipeline, or both.

In some examples, the system can render and display graphical information. For example, the operations can include extrapolating a deposit profiles over time and simultaneously displaying hydraulic diameters for the pipeline, each based on one of the deposit profiles and corresponding to one of the times. In some examples, the operations further include displaying a graphical summary of the deposit profile.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
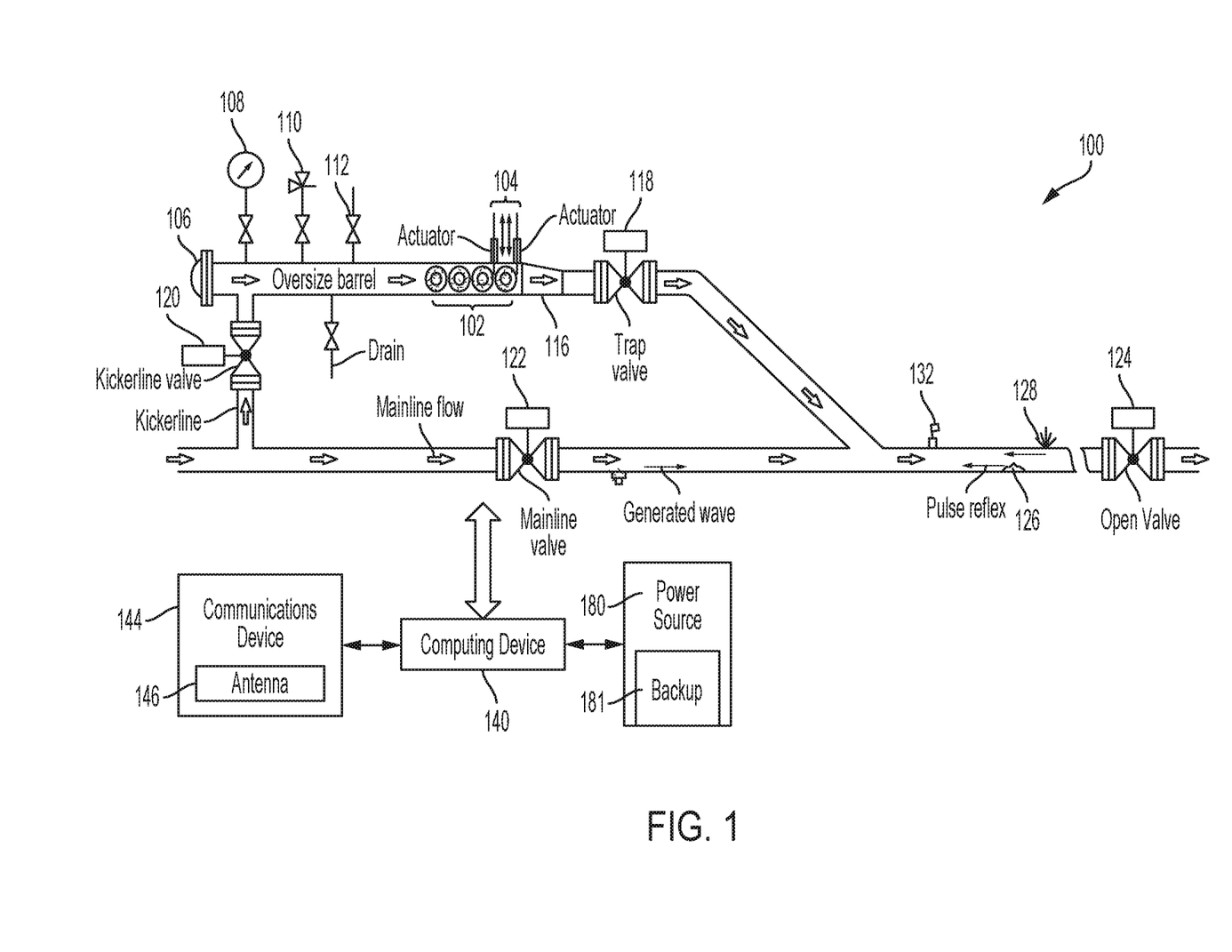
FIG. 1 is a schematic, cross-sectional view of an example of a launching and monitoring system that includes the capability for monitoring of the pipeline over time and determining an optimum time at which to launch a pig using an automatic multiple pig launcher according to some aspects of the disclosure.

FIG. 1 is a schematic, cross-sectional view of an example of a launching and monitoring system that includes the capability for monitoring of the pipeline over time and determining an optimum time when to launch a pig using an automatic multiple pig launcher according to some aspects of the disclosure. FIG. 1 shows a system 100 including an AMPL adapted to connect to a computing system. FIG. 1 includes details of the AMPL included in system 100. The launcher in FIG. 1 can include a cassette 102 containing multiple pigs. Control pin assembly 104 includes actuators, which can release a pig when activated. The pigs are inserted through closure door 106. The upper portion of the launcher also includes a pressure indicator 108, a pressure release assembly 110, a vent 112, and a drain section 114.

Continuing with FIG. 1, the number of pigs is predetermined by the size of the trap. When a pig launches, it passes through reducer 116 and the trap valve, which is controlled by actuator 118. The actuator can be electrical, hydraulic or pneumatic. The launcher also includes a kickerline valve controlled by an actuator 120 and a mainline valve controlled by an actuator 122. A line open valve can be actuated using actuator 124 and seals the launching system off from the pipeline when necessary. The mainline flow in FIG. 1 is indicated by wide arrows, while the right-going thin arrow indicates the generated pressure wave created by activating the mainline valve with actuator 122, and the left-going thin arrows indicate the reflex pulse response.

Still referring to FIG. 1, in this example, the pressure wave is generated in the pipeline by activating the mainline valve using actuator 122. Alternatively, the trap valve can be activated using actuator 118 to generate the outgoing pulse. The reflex pressure pulse can be analyzed to evaluate blockages such as blockage 126, and in some examples to determine the presence or absence of a leak such as leak 128. The reflex pressure pulse is measured by pressure transducer 130, which can be coupled with the pipeline such as by connecting it with or installed it within the pipeline. When a pig is ultimately launched, local personnel can confirm the launch if desired by observing pig launch indicator 132. Computing device 140 is connected to the AMPL via local or remote network connections (not shown). The computing device is connected to a power source 180 that includes a backup 181. Computing device 140 is also connected to a communication device. In some aspects the communication device can be a wireless communication device 144 that includes an antenna 146. Further details of the computing device, its connections, and its operation are discussed below with respect to FIG. 6.

Using the above-described AMPL system, a pulse of pressure is induced in the pipeline through a fast acting valve closure or alternatively can be induced by the rapid opening and closing of a valve on a blocked line. The valve closure creates the generated wave (similar to the water hammer effect) that will travel through the pipe at the speed of sound. The magnitude of the pulse and the reflex pulse pressure response in the pipeline from the induced pulse is measured as it travels along the pipeline using one or more pressure transducers. During a deposit profiling or leak detection operation, the pressure transducer is located close to the valve that will be used to generate the pulse of pressure. The transducer can be situated at either the inlet or outlet end of the pipeline. The reflections or reflex response from the pulse as it passes through the pipeline is processed as a pressure response to give the location and thickness of deposits. In some examples, the reflex pulse can also be analyzed to determine the location and magnitude of leaks.

Figure 2:
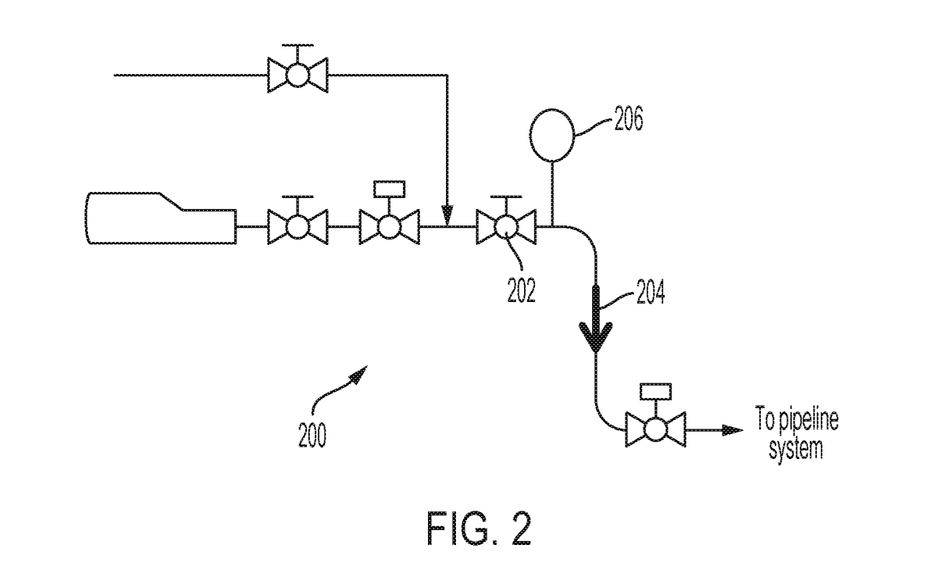
FIG. 2 is a schematic diagram illustrating the use of a pulse reflex for pipeline monitoring where the initiating pressure wave is generated at the upstream end of a pipeline according to some aspects of the disclosure.
Figure 3:
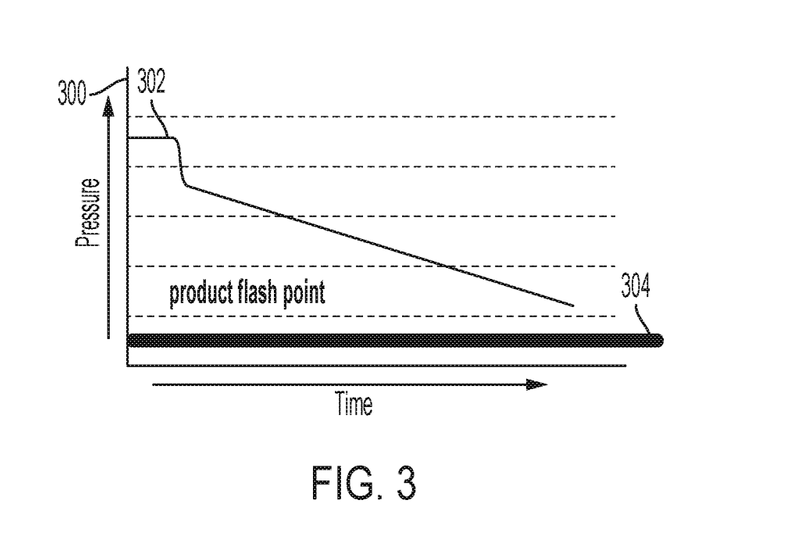
FIG. 3 is a graph of a pressure curve showing the characteristics of the pressure wave generated at the upstream end of a pipeline according to some aspects of the disclosure.

FIG. 2 is a schematic illustration 200 of the pulse generation from the inlet or upstream end of the pipeline. Valve 202 is closed to generate the pressure wave 204 in the pipeline. Pressure transducer 206 is used to monitor the reflex pressure pulse returning through the pipeline. As illustrated by graph 300 of FIG. 3, the profile 302 of the induced pressure pulse at the upstream end of the pipeline will be a negative pulse. The pressure line 304 for the flash point of fluid in the pipeline is also shown for comparison purposes.

Figure 4:
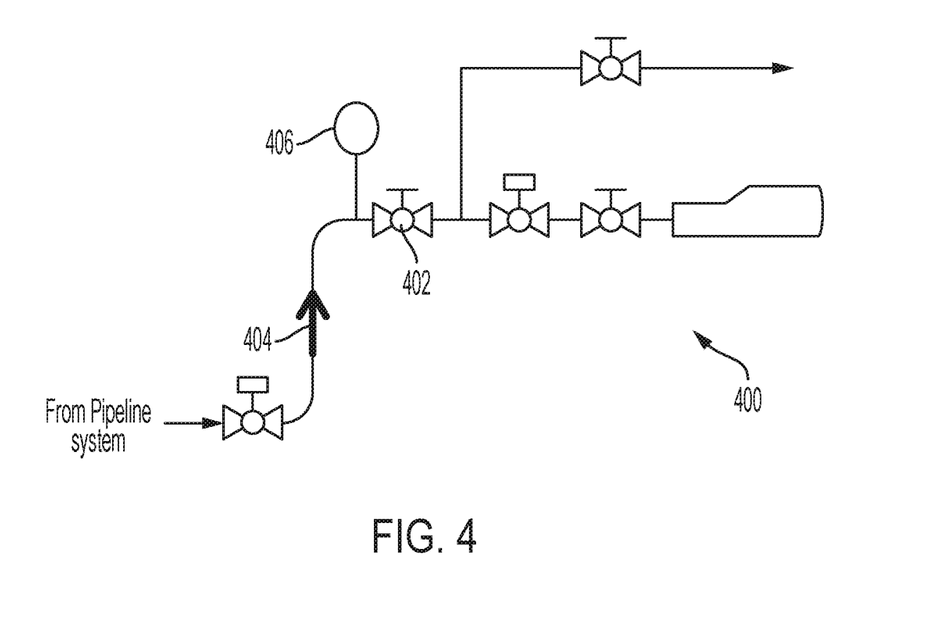
FIG. 4 is a schematic diagram illustrating the use of a pulse reflex for pipeline monitoring where the initiating pressure wave is generated at the downstream end of a pipeline according to some aspects of the disclosure.
Figure 5:
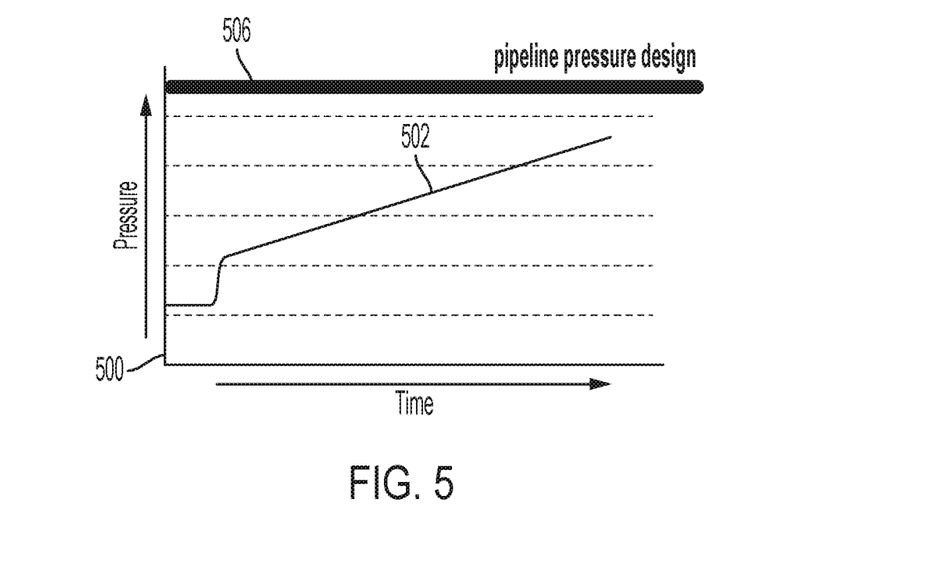
FIG. 5 is a graph of a pressure curve showing the characteristics of the pressure wave generated at the downstream end of a pipeline according to some aspects of the disclosure.

Alternatively for a pulse generated at the downstream end of the pipeline the profile will be a positive pulse. The data that results with either a positive or negative pulse is essentially the same. FIG. 4 is a schematic illustration 400 of the pulse generation from the outlet or downstream end of the pipeline. Valve 402 is closed to generate the pressure wave 404 in the pipeline. Pressure transducer 406 is used to monitor the reflex pressure pulse returning from the pipeline. As illustrated by graph 500 of FIG. 5, the profile 502 of the induced pressure pulse at the downstream end of the pipeline will be a positive pulse. The pressure line 506 for the maximum pressure supported by the pipeline is also shown for comparison purposes.

Figure 6:
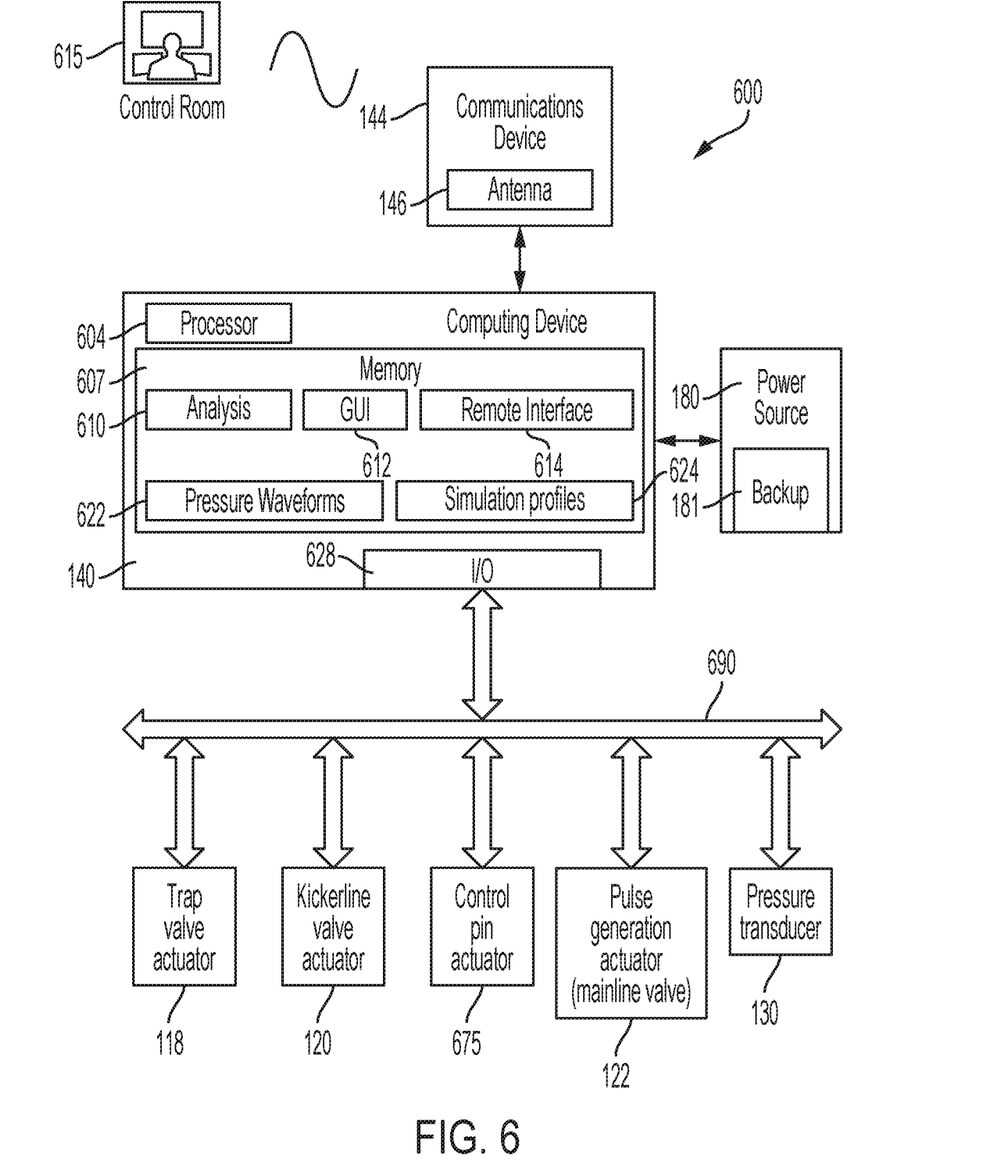
FIG. 6 is a block diagram of the example of a launching and monitoring system that includes the capability for monitoring of the pipeline over time and determining an optimum time at which to launch a pig using an automatic multiple pig launcher according to some aspects of the disclosure.

FIG. 6 is a block diagram of the example of a launching and monitoring system 100 that includes the capability for real-time monitoring of the pipeline over time and determining an optimum time to launch a pig using an automatic multiple pig launcher according to some aspects of the disclosure. The view of FIG. 6 emphasizes the electronics, computing, and communication aspects of the system. The system includes the actuators and transducer shown in FIG. 1. FIG. 6 also shows the computing device 140, power source 180, and communications device 144 of FIG. 1. These devices can be integrated into a single structure. For example, the components can be within a single housing. In other examples, the components can be distributed (e.g., in separate housings) and in electrical communication with each other.

The system 100 as shown in FIG. 6 includes the computing device 140. The computing device 140 can include a processor 604 and a memory 607. The processor 604 can execute one or more operations for requesting a pressure wave and monitoring a reflex pulse using transducer 130 once the pressure wave is generated. The processor 604 can generate the pressure wave directly by operating an actuator, or provide an instruction to an operator. It may only be practical for an operator to manipulate the valves quickly enough to generate the pressure wave in smaller pipelines. The processor 604 can execute computer program code instructions 610 stored in the memory 607 to perform the operations that control the AMPL, monitor the reflex pulse, and perform the analysis to extrapolate deposit profiles. The processor 604 can also execute instructions 612 to display information via a graphical user interface (GUI). The processor 604 can execute instructions 614 to provide communications through a remote interface to and from a remote control room 615. The processor 604 can include one processing device or multiple processing devices. Non-limiting examples of the processor 604 include a Field-Programmable Gate Array ("FPGA"), an application-specific integrated circuit ("ASIC"), a microprocessor, etc.

Still referring to FIG. 6, the non-volatile memory 607 may include any type of memory device that retains stored information when powered off. Non-limiting examples of the memory 607 include electrically erasable and programmable read-only memory ("EEPROM"), flash memory, or any other type of non-volatile memory. In some examples, at least part of the memory 607 can include a medium from which the processor 604 can read instructions. A non-transitory computer-readable medium can include electronic, optical, magnetic, or other storage devices capable of providing the processor 604 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

Continuing with FIG. 6, in some examples, the memory 607 can include stored reflex pressure waveforms 622 captured using pressure transducer 130 and stored in memory 607 for analysis by processor 604 executing computer program code instructions 610. Memory 607 can also include stored clean simulation profiles 624, used in extrapolating deposit profiles for the pipeline as discussed in more detail below with respect to FIGS. 7 and 8. The system 100 can include a power source 180. The power source 180 can include a backup power source 181. The power source 180 can be in electrical communication with the computing device 140 and the communication device 144. In some examples, the power source 180 can include a battery or an electrical cable. In some examples, the power source 180 can include an AC signal generator. The computing device 140 can operate the power source 180 to apply a signal to the communication device 144 to transmit pressure waveforms or other information. For example, the computing device 140 can cause the power source 180 to apply a voltage with a frequency within a specific frequency range to the communication device 144. In other examples, the computing device 140, rather than the power source 180, can apply the signal to communication device 144.

The communication device 144 of FIG. 6 can be implemented or partially implemented in software. For example, the communication device 144 can include instructions stored in memory 607. The communication device 144 can receive signals from remote devices and transmit data to remote devices. For example, the communication device 144 can transmit wireless communications that are modulated by data. In some examples, the communication device 144 can receive signals (e.g., associated with data to be transmitted) from the processor 604 and amplify, filter, modulate, frequency shift, and otherwise manipulate the signals.

System 100 in FIG. 6 also includes input/output interface 628. Input/output interface 628 can connect to a keyboard, pointing device, display, and other computer input/output devices. An operator may provide input using the input/output interface 628. Such input may include a command to manually launch a pig or to initiate a pressure wave. Input/output interface 628 can also be used to display information locally, such as pressure readings or pressure waveforms, using a display device (not shown.). Input/output interface 628 in this example includes a network interface to local network 690, which connects computing device 140 to the control pin actuator 675 used to launch a pig from the AMPL. Local network 690 also connects computing device 140 to the various valve actuators and the pressure transducer 130 discussed above with respect to FIG. 1.

Figure 7:
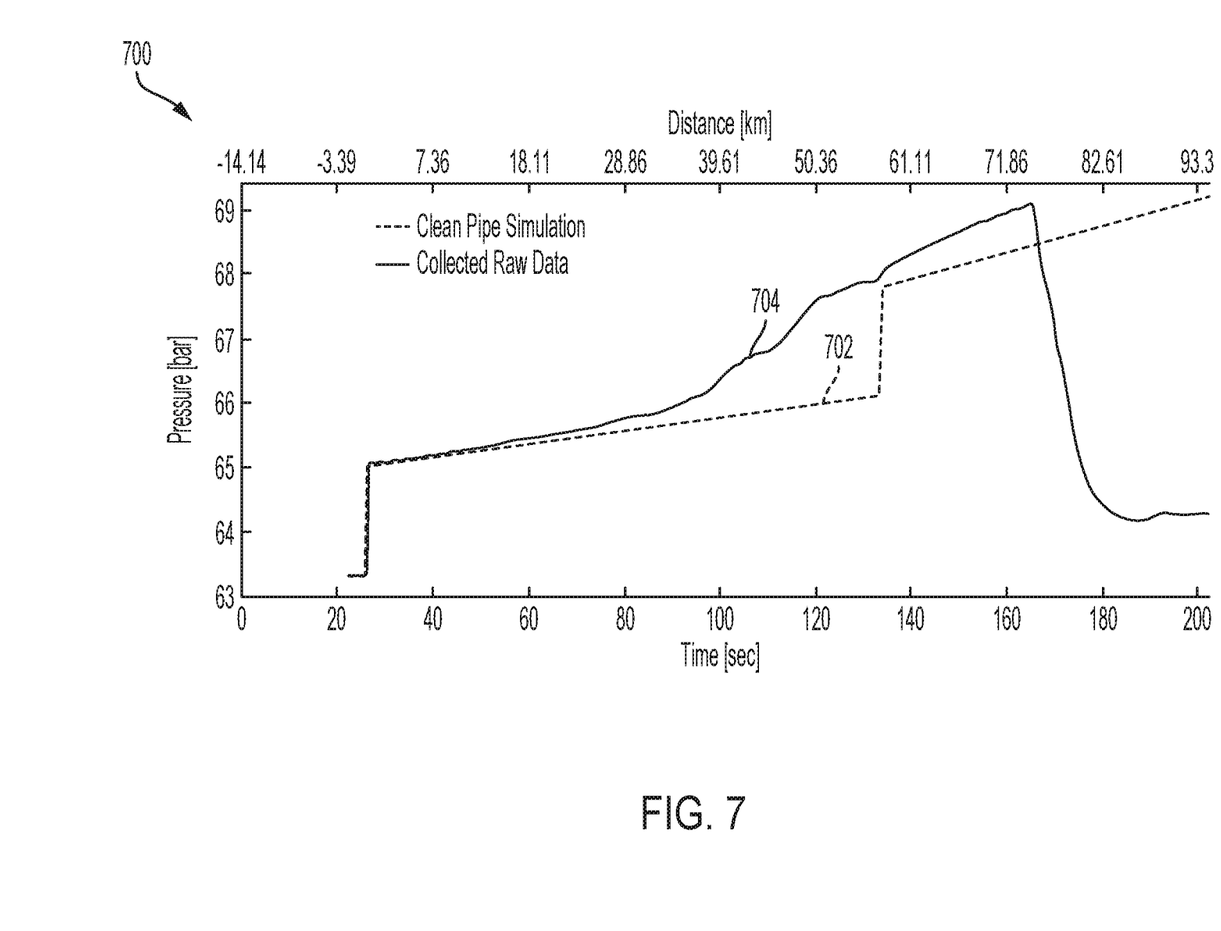
FIG. 7 is a graph illustrating a comparison of a pressure profile based on measurements automatically made on an operating pipeline with a pressure profile based on a simulation of the same pipeline in a clean and uncompromised state according to some aspects of the disclosure.

In order to interrogate a pipeline and provide information about the available, unobstructed hydraulic diameter of the pipeline, or information about any leaks, a reflex pressure profile is compared to a simulated pressure profile for an unobstructed pipeline with no leaks. FIG. 7 depicts a graph 700 showing a clean simulation profile 702 and a reflex pressure profile 704 determined from flow data collected from a pressure transducer. Pressure is graphed as a function of distance. Such a comparison is used in the process discussed immediately below.

Figure 8:
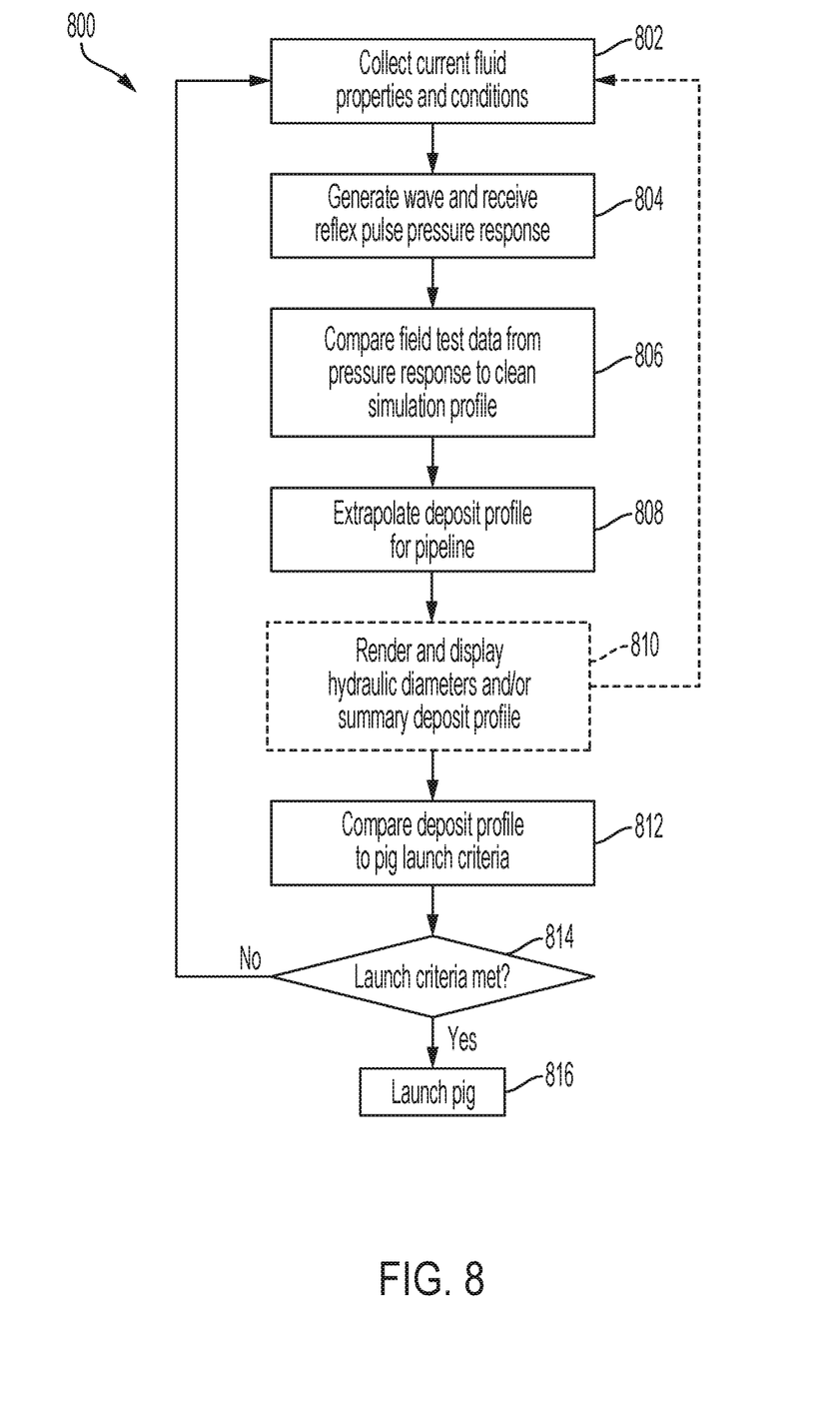
FIG. 8 is a flowchart of a process for monitoring of the pipeline over time and determining an optimum time at which to launch a pig using an automatic multiple pig launcher according to some aspects of the disclosure.

FIG. 8 is a flowchart of a process 800 for monitoring of the pipeline over time and determining an optimum time for launching a pig using an automatic multiple pig launcher according to some aspects of the disclosure. At block 802, fluid properties and conditions of the pipeline are collected. These may have been previously automatically collected and stored in memory, or could be manually introduced by an operator. In many cases, these will not change significantly over time, so that properties only need to be collected and stored occasionally or when changes are made to the fluid or pipeline configuration. At block 804, the system generates the interrogation pressure wave and receives a reflex pulse pressure response, which is captured by pressure transducer 130. At block 806, the reflex pressure response captured from the field test is compared to a clean simulation profile stored in memory.

One equation used to describe reflections of pressure waves in pipes, is the Jowkowski equation, where:

$$\Delta p = -\rho c \Delta v,$$

where $\Delta p$ is the change in pressure, $\rho$ is the density of fluid, c is the speed of sound in the pipeline fluid and $\Delta v$ is the local change in fluid velocity. If one assumes that the density and speed of sound stay constant, any change in pressure is brought about by a change in fluid velocity. If volume flow rate is assumed to be fixed at Q then the velocity at any location in the pipe is:

$$v = Q/A$$

where A is the local cross-sectional area. Then the change in velocity is given by:

$$\Delta v = -Q(\Delta A)/A^2,$$

where $\Delta A$ is the change in local cross-sectional area.

The magnitude of the pressure pulse generated by a quick-acting valve can be measured by the pressure transducer. In flow systems where the upstream and down-stream pipelines are sufficiently long, the pressure increase immediately upstream of the quick-acting valve will be the same as given by the water-hammer equation.

Frictional pressure drop in pipelines is governed by the Darcy-Weisbach equation:

$$\Delta p_{\_f} = \left(\frac{f}{2}\right)\left(\frac{\Delta L}{d}\right)\rho v^2,$$

where f (dimensionless) is the friction factor, $\Delta L$ (meters) is the pipe length, and d (meters) is the pipe diameter. The Darcy-Weisbach equation as shown here holds for single-phase laminar and turbulent flow. In principle, the equation can be extended to hold also for multiphase flow. The friction factor in single-phase and multiphase flows can be obtained from semi-empirical relationships such as the Blasius-equation. The Blasius-equation is used when the flow is hydrodynamically smooth. If the flow is rough, the Colebrook-White equation can be used.

Returning to FIG. 8, based on the above, a deposit profile is extrapolated for the pipeline at block 808. At block 810, optionally, the hydraulic diameter is rendered and displayed on a graphical display, either locally or at control room 615. The process can be repeated at multiple times to extrapolate deposit profiles at multiple times and these deposit profiles can be simultaneously displayed. Additionally or alternatively, the system can display a graphical summary of the deposit profile over time.

Continuing with FIG. 8, at block 812, the deposit profile is compared to a pig launch criterion or pig launch criteria. A decision is made at block 814 as to whether a criterion is met. If not, process 800 repeats. Otherwise, a pig can be automatically launched at the appropriate time at block 816. Profiling of the pipeline can be repeated at regular intervals and a predicted future time can be selected based on trends. At this selected time the pig can be launched. Alternatively, predictions can be used to determine when to take the next profile and a pig can be launched immediately upon, as an example, a minimum hydraulic pipeline diameter being reached or the hydraulic diameter of the pipeline falling below a threshold. Criteria can be applied at the average debris level, the average amount, the maximum obstruction in-line, or any combination of these, and at a specific point or over some portion of the pipeline's length, etc. An operator can design and store any criteria desired.

In some examples, pipeline conditions determined and stored in block 802 above include, but are not limited to, pipeline internal diameter, pipeline wall thickness, pipeline material Young's modulus, pipeline length, friction factor, pipeline material type, topography, temperature gradient, pressure gradient, and unusual features (if any). In some examples, fluid properties determined and stored at block 802 include likely deposit composition and distribution, product phase, flowrate, fluid density, fluid bulk modulus, and fluid viscosity.

Figure 9:
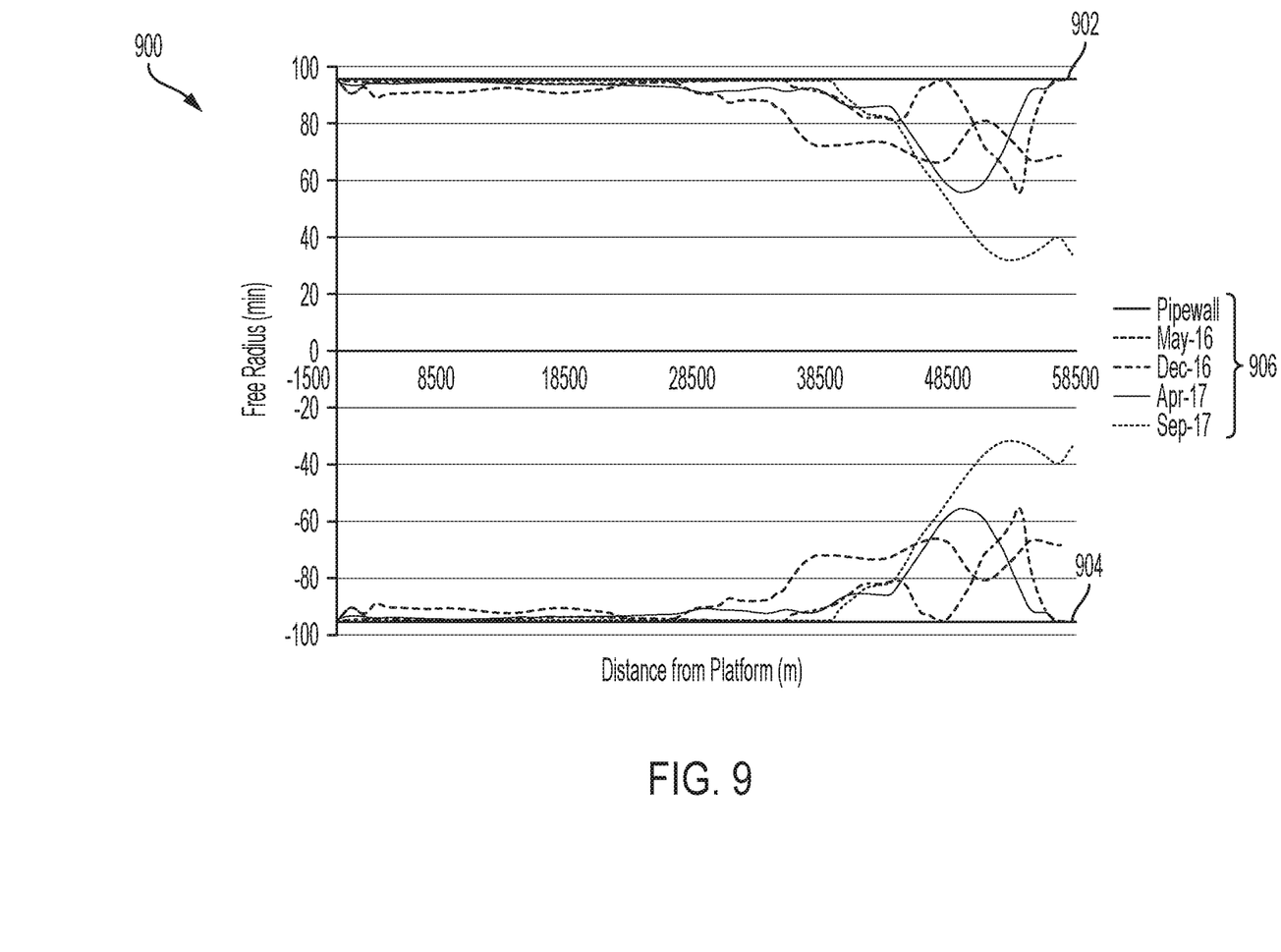
FIG. 9 is a screen display that includes a graph of hydraulic diameters of a pipeline based on pressure pulse surveys taken on various dates over time according to some aspects of the disclosure.

FIG. 9 is a screen display 900 that includes a graph of hydraulic diameters of a pipeline based on pressure pulse surveys taken on various dates over time according to some aspects of the disclosure. The graph shows representations as both a positive free (top) and a reduction in free radius (bottom). Flat lines 902 and 904 represent the pipeline wall. Key 906 allows identification of the date of each survey.

Figure 10:
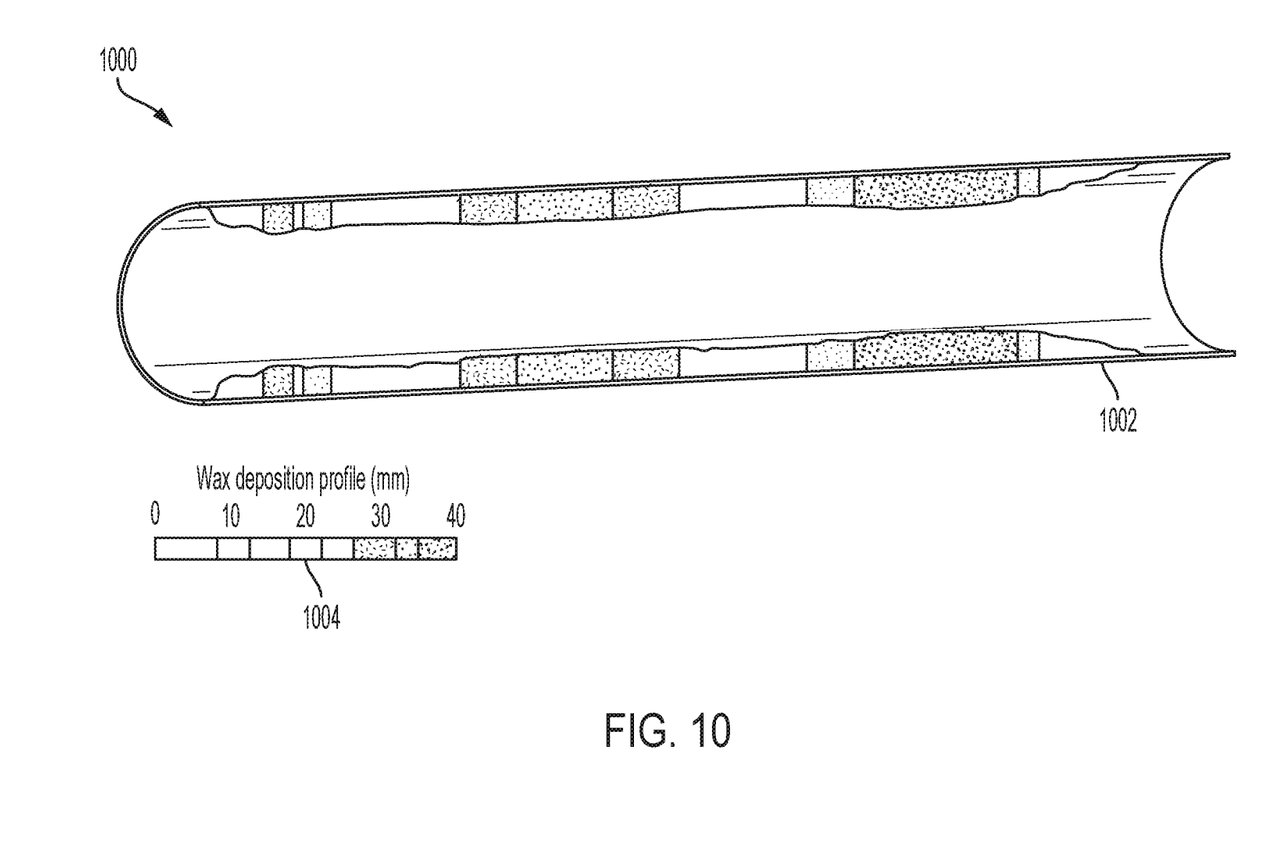
FIG. 10 is a screen display that includes a color-coded image of a wax deposit profile in a pipeline according to some aspects of the disclosure.

FIG. 10 is a screen display 1000 that includes a color-coded image of a cumulative wax deposit profile in the pipeline according to some aspects of the disclosure. In an actual display, cross-sectional pipeline image 1002 includes a relative height of deposit indication running along the interior of the pipeline image. This indication is color coded for height in millimeters and key 1004 provides the user with an indication of which colors correspond to which deposit height ranges.

Use of the pig launching and monitoring system as described via the examples herein presents minimal risk for disruption of pipeline flow or the integrity of the pipeline. There is no direct intervention into the pipeline operations. A fluid hammer will be generated within the pipeline when the interrogation pulse wave is generated, however the level of fluid hammer required is far below a level likely to cause any significant issue with a typical pipeline system. During a debris profile survey, pressure will build in the pipeline upstream of the pulse generation valve during the survey time. This pressure build-up can be modeled prior to deploying or actively using a system so that any risk can be assessed and mitigation measures can put in place if needed to ensure there is no risk of over-pressurization.

There is no theoretical limit on the maximum distance that can be surveyed with the techniques described herein. However, long pipelines should be evaluated individually as the pipeline condition, process parameters and fluid properties may impact the ability of the pulse to travel the pipeline. The minimum length of pipeline that can be surveyed is dependent on the duration taken to generate the pulse and the acoustic velocity of the pipeline contents. Similarly, there is no theoretical minimum or maximum diameter that can be surveyed, however, at least unusually-sized pipelines should be evaluated on a case by case basis as the pipeline condition, process parameters and fluid properties impact the ability of the pulse to travel the pipeline.

Terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" or "comprising," when used in this specification, specify the presence of stated features, steps, operations, elements, or components, but do not preclude the presence or addition of one or more other features, steps, operations, elements, components, or groups thereof. Additionally, comparative, quantitative terms such as "above," "beneath," "less," and "greater" are intended to encompass the concept of equality, thus, "less" can mean not only "less" in the strictest mathematical sense, but also, "less than or equal to."

Unless specifically stated otherwise, it is appreciated that throughout this specification that terms such as "processing," "calculating," "determining," "operations," or the like refer to actions or processes of a computing device, such as the controller or processing device described herein, that can manipulate or transform data represented as physical electronic or magnetic quantities within memories, registers, or other information storage devices, transmission devices, or display devices. The order of the process blocks presented in the examples above can be varied, for example, blocks can be re-ordered, combined, or broken into sub-blocks. Certain blocks or processes can be performed in parallel. The use of "configured to" herein is meant as open and inclusive language that does not foreclose devices configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Elements that are described as "coupled," "connected," "connectable," or with similar terms can be connected or communicate directly or through intervening elements.

In some aspects, a system for monitoring a pipeline includes one or more of the following examples. As used below, any reference to a series of examples is to be understood as a reference to each of those examples disjunctively (e.g., "Examples 1-4" is to be understood as "Examples 1, 2, 3, or 4").

Example 1. A system includes a pressure transducer connectable to, or installable in, a pipeline for transporting hydrocarbon fluids, a processing device communicatively couplable to the pressure transducer, and a non-transitory memory device including instructions that are executable by the processing device to cause the processing device to perform operations. The operations include generating a pressure wave in the pipeline, recording a reflex pressure pulse as a function of time in response to the pressure wave to produce a pressure response; comparing the pressure response to a clean simulation profile of the pipeline to extrapolate a deposit profile for the pipeline, and determining a launch time for a pipeline inspection gauge by comparing the deposit profile for the pipeline to at least one launch criterion for the pipeline inspection gauge.

Example 2. The system of example 1, wherein the operations further include launching the pipeline inspection gauge at the launch time.

Example 3. The system of example(s) 1-2 further includes an automatic multiple pig launcher communicatively couplable to the processing device wherein the operations further include activating the automatic multiple pig launcher.

Example 4. The system of example(s) 1-3 wherein the operations further include determining a presence or absence of leaks in the pipeline by comparing the pressure response to the clean simulation profile.

Example 5. The system of example(s) 1-4 wherein the operations further include producing the clean simulation profile for the pipeline using at least one of current properties of the fluid in the pipeline or current operating conditions of the pipeline.

Example 6. The system of example(s) 1-5 wherein the operations further include extrapolating deposit profiles at multiple times, and simultaneously displaying hydraulic diameters for the pipeline, each based on one of the deposit profiles and corresponding to one of the times.

Example 7. The system of example(s) 1-6 wherein the operations further include displaying a graphical summary of the deposit profile.

Example 8. A method includes requesting, by a processor, a pressure wave in a pipeline; recording, by the processor, a reflex pressure pulse as a function of time in response to the pressure wave to produce a pressure response, comparing, by the processor, the pressure response to a clean simulation profile of the pipeline to extrapolate a deposit profile for the pipeline, and determining, by the processor, a launch time for a pipeline inspection gauge by comparing the deposit profile for the pipeline to at least one launch criterion for the pipeline inspection gauge.

Example 9. The method of example 8 further includes launching the pipeline inspection gauge at the launch time.

Example 10. The method of example(s) 8-9 wherein the launching of the pipeline inspection gauge includes activating an automatic multiple pig launcher.

Example 11. The method of example(s) 8-10 further includes determining a presence or absence of leaks in the pipeline by comparing the pressure response to the clean simulation profile.

Example 12. The method of example(s) 8-11 further includes producing the clean simulation profile for the pipeline using at least one of current properties of the fluid in the pipeline or current operating conditions of the pipeline.

Example 13. The method of example(s) 8-12 further includes extrapolating deposit profiles at multiple times, and simultaneously displaying hydraulic diameters for the pipeline, each based on one of the deposit profiles and corresponding to one of the times.

Example 14. A non-transitory computer-readable medium includes instructions that are executable by a processor for causing the processor to perform operations related to monitoring an available, unobstructed hydraulic diameter of a pipeline. The operations include generating a pressure wave in the pipeline, recording a reflex pressure pulse as a function of time in response to the pressure wave to produce a pressure response, comparing the pressure response to a clean simulation profile of the pipeline to extrapolate a deposit profile for the pipeline, and determining a launch time for a pipeline inspection gauge by comparing the deposit profile for the pipeline to at least one launch criterion for the pipeline inspection gauge.

Example 15. The non-transitory computer-readable medium of example 14, wherein the operations further include launching the pipeline inspection gauge at the launch time.

Example 16. The non-transitory computer-readable medium of example(s) 14-15 further wherein the launching of the pipeline inspection gauge includes activating an automatic multiple pig launcher.

Example 17. The non-transitory computer-readable medium of example(s) 14-16 wherein the operations further include determining a presence or absence of leaks in the pipeline by comparing the pressure response to the clean simulation profile.

Example 18. The non-transitory computer-readable medium of example(s) 14-17 wherein the operations further include producing the clean simulation profile for the pipeline using at least one of current properties of the fluid in the pipeline or current operating conditions of the pipeline.

Example 19. The non-transitory computer-readable medium of example(s) 14-18 wherein the operations further include extrapolating a deposit profiles at multiple times, and simultaneously displaying hydraulic diameters for the pipeline, each based on one of the deposit profiles and corresponding to one of the times.

Example 20. The non-transitory computer-readable medium of example(s) 14-19 wherein the operations further include displaying a graphical summary of the deposit profile.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A system comprising:
   a pressure transducer for coupling with a pipeline for transporting hydrocarbon fluids;
   a processing device communicatively couplable to the pressure transducer; and
   a non-transitory memory device comprising instructions that are executable by the processing device to cause the processing device to perform operations including:
   generating a pressure wave in the pipeline;
   recording a reflex pressure pulse as a function of time in response to the pressure wave to produce a pressure response;
   comparing the pressure response to a clean simulation profile of the pipeline to extrapolate a deposit profile for the pipeline; and
   determining a launch time for a pipeline inspection gauge by comparing the deposit profile for the pipeline to at least one launch criterion for the pipeline inspection gauge.

2. The system of claim 1, wherein the operations further comprise launching the pipeline inspection gauge at the launch time.

3. The system of claim 2 further comprising an automatic multiple pig launcher communicatively couplable to the processing device wherein the operations further comprise activating the automatic multiple pig launcher.

4. The system of claim 1 wherein the operations further comprise determining a presence or absence of leaks in the pipeline by comparing the pressure response to the clean simulation profile.

5. The system of claim 1 wherein the operations further comprise producing the clean simulation profile for the pipeline using at least one of current properties of the fluid in the pipeline or current operating conditions of the pipeline.

6. The system of claim 1 wherein the operations further comprise:
   extrapolating a plurality of deposit profiles at a plurality of times; and
   simultaneously displaying a plurality of hydraulic diameters for the pipeline, each based on one of the deposit profiles and corresponding to one of the plurality of times.

7. The system of claim 1 wherein the operations further comprise displaying a graphical summary of the deposit profile.

8. A method comprising:
   requesting, by a processor, a pressure wave in a pipeline;
   recording, by the processor, a reflex pressure pulse as a function of time in response to the pressure wave to produce a pressure response;
   comparing, by the processor, the pressure response to a clean simulation profile of the pipeline to extrapolate a deposit profile for the pipeline; and
   determining, by the processor, a launch time for a pipeline inspection gauge by comparing the deposit profile for the pipeline to at least one launch criterion for the pipeline inspection gauge.

9. The method of claim 8 further comprising launching the pipeline inspection gauge at the launch time.

10. The method of claim 9 wherein the launching of the pipeline inspection gauge includes activating an automatic multiple pig launcher.

11. The method of claim 8 further comprising determining a presence or absence of leaks in the pipeline by comparing the pressure response to the clean simulation profile.

12. The method of claim 8 further comprising producing the clean simulation profile for the pipeline using at least one of current properties of the fluid in the pipeline or current operating conditions of the pipeline.

13. The method of claim 8 further comprising:
   extrapolating a plurality of deposit profiles at a plurality of times; and
   simultaneously displaying a plurality of hydraulic diameters for the pipeline, each based on one of the deposit profiles and corresponding to one of the plurality of times.

14. A non-transitory computer-readable medium that includes instructions that are executable by a processor for causing the processor to perform operations related to monitoring an available, unobstructed hydraulic diameter of a pipeline, the operations comprising:
   generating a pressure wave in the pipeline;
   recording a reflex pressure pulse as a function of time in response to the pressure wave to produce a pressure response;
   comparing the pressure response to a clean simulation profile of the pipeline to extrapolate a deposit profile for the pipeline; and
   determining a launch time for a pipeline inspection gauge by comparing the deposit profile for the pipeline to at least one launch criterion for the pipeline inspection gauge.

15. The non-transitory computer-readable medium of claim 14, wherein the operations further comprise launching the pipeline inspection gauge at the launch time.

16. The non-transitory computer-readable medium of claim 15 further wherein the launching of the pipeline inspection gauge includes activating an automatic multiple pig launcher.

17. The non-transitory computer-readable medium of claim 14 wherein the operations further comprise determining a presence or absence of leaks in the pipeline by comparing the pressure response to the clean simulation profile.

18. The non-transitory computer-readable medium of claim 14 wherein the operations further comprise producing the clean simulation profile for the pipeline using at least one of current properties of the fluid in the pipeline or current operating conditions of the pipeline.

19. The non-transitory computer-readable medium of claim 14 wherein the operations further comprise:
   extrapolating a plurality of deposit profiles at a plurality of times; and
   simultaneously displaying a plurality of hydraulic diameters for the pipeline, each based on one of the deposit profiles and corresponding to one of the plurality of times.

20. The non-transitory computer-readable medium of claim 14 wherein the operations further comprise displaying a graphical summary of the deposit profile.

* * * * *